US009864430B2

(12) United States Patent
Wu et al.

(10) Patent No.: US 9,864,430 B2
(45) Date of Patent: Jan. 9, 2018

(54) GAZE TRACKING VIA EYE GAZE MODEL

(71) Applicant: Microsoft Technology Licensing, LLC, Redmond, WA (US)

(72) Inventors: Dijia Wu, Sammamish, WA (US); Michael J. Conrad, Monroe, WA (US); Tim Burrell, Kirkland, WA (US); Xu Miao, Seattle, WA (US); Zicheng Liu, Bellevue, WA (US); Qin Cai, Clyde Hill, WA (US); Zhengyou Zhang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 65 days.

(21) Appl. No.: 14/593,955

(22) Filed: Jan. 9, 2015

(65) Prior Publication Data

US 2016/0202756 A1    Jul. 14, 2016

(51) Int. Cl.
*G06K 9/00* (2006.01)
*G06F 3/01* (2006.01)
(Continued)

(52) U.S. Cl.
CPC ............ *G06F 3/013* (2013.01); *G06F 3/0304* (2013.01); *G06F 3/038* (2013.01); *G06K 9/0061* (2013.01)

(58) Field of Classification Search
None
See application file for complete search history.

(56) References Cited

U.S. PATENT DOCUMENTS 6,353,814 B1    3/2002 Weng
6,393,136 B1 *  5/2002 Amir ...................... G06T 7/004
                                                348/14.01
(Continued)

FOREIGN PATENT DOCUMENTS

CN    101833646 A    9/2010
CN    102902967 A    1/2013
(Continued)

OTHER PUBLICATIONS

Bar, et al., "Driver Head Pose and Gaze Estimation based on Multi-Template ICP 3D Point Cloud Alignment", In Proceedings of the 15th International IEEE Conference on Intelligent Transportation Systems, Sep. 16, 2012, 8 pages.
(Continued)

*Primary Examiner* — Hadi Akhavannik
(74) *Attorney, Agent, or Firm* — Alleman Hall Creasman & Tuttle LLP

(57) ABSTRACT

Examples are disclosed herein that are related to gaze tracking via image data. One example provides, on a gaze tracking system comprising an image sensor, a method of determining a gaze direction, the method comprising acquiring image data via the image sensor, detecting in the image data facial features of a human subject, determining an eye rotation center based upon the facial features using a calibrated face model, determining an estimated position of a center of a lens of an eye from the image data, determining an optical axis based upon the eye rotation center and the estimated position of the center of the lens, determining a visual axis by applying an adjustment to the optical axis, determining the gaze direction based upon the visual axis, and providing an output based upon the gaze direction.

20 Claims, 15 Drawing Sheets

(51) Int. Cl.
G06F 3/03 (2006.01)
G06F 3/038 (2013.01)

(56) References Cited

U.S. PATENT DOCUMENTS

| | | | |
|---|---|---|---|
| 7,538,711 B2 | 5/2009 | Chung et al. | |
| 7,742,623 B1 | 6/2010 | Moon et al. | |
| 8,064,647 B2 | 11/2011 | Bazakos et al. | |
| 8,213,680 B2 | 7/2012 | Fitzgibbon et al. | |
| 8,745,541 B2 | 6/2014 | Wilson et al. | |
| 8,810,513 B2 | 8/2014 | Ptucha et al. | |
| 8,885,882 B1 | 11/2014 | Yin et al. | |
| 2006/0120571 A1* | 6/2006 | Tu | G06K 9/00281 382/118 |
| 2007/0052698 A1* | 3/2007 | Funayama | G06T 7/0046 345/419 |
| 2009/0196460 A1* | 8/2009 | Jakobs | G06F 3/013 382/103 |
| 2012/0239396 A1 | 9/2012 | Johnston et al. | |
| 2012/0293635 A1 | 11/2012 | Sharma et al. | |
| 2013/0027296 A1 | 1/2013 | Klein et al. | |
| 2013/0121526 A1 | 5/2013 | Smolyanskiy et al. | |
| 2013/0182904 A1 | 7/2013 | Zhang et al. | |
| 2013/0290911 A1 | 10/2013 | Praphul et al. | |
| 2014/0361996 A1 | 12/2014 | Eden et al. | |
| 2015/0077543 A1 | 3/2015 | Kerr et al. | |
| 2016/0232399 A1 | 8/2016 | Kempinski et al. | |

FOREIGN PATENT DOCUMENTS

| | | |
|---|---|---|
| WO | 2012150731 A1 | 11/2012 |
| WO | 2013029008 A1 | 2/2013 |
| WO | 2013170383 A1 | 11/2013 |

OTHER PUBLICATIONS

Wang, et al., "A 3D Driver Head Pose Estimation Method Based on Depth Image", In Proceedings of International Conference on Internet Multimedia Computing and Service, Jul. 10, 2014, 5 pages.
Mora, et al., "Geometric Generative Gaze Estimation (G3E) for Remote RGB-D Cameras", In Proceedings of IEEE Computer Vision and Pattern Recognition Conference, Jun. 2014, 17 pages.
Mora, et al., "3D Gaze Tracking and Automatic Gaze Coding from RGB-D Cameras", In Proceedings of IEEE Conference in Computer Vision and Pattern Recognition, Vision Meets Cognition Workshop, Jun. 2014, 2 pages.
Salam, et al., "Integrating Head Pose to a 3d Multitexture Approach for Gaze Detection", In International Journal of Multimedia & Its Applications, vol. 5, Issue 4, Aug., 2013, 22 pages.
Jianfeng, et al., "Eye-Model-Based Gaze Estimation by RGB-D Camera", In Proceedings of the IEEE Conference on Computer Vision and Pattern Recognition Workshops, Jun. 24, 2014, 5 pages.
Maind, et al., "A Review on Hand and Speech Based Interaction with Mobile Phone", In IEEE International Conference on Advances in Engineering and Technology, May 2, 2014, pp. 40-44.
Pan, et al., "GeeAir: A Universal Multimodal Remote Control Device for Home Appliances", In Proceedings of Personal and Ubiquitous Computing, vol. 14, Issue 8, Mar. 10, 2010, pp. 723-735.
Murphy-Chutorian, et al., "Head pose estimation in computer vision: A survey." Pattern Analysis and Machine Intelligence, IEEE Transactions on 31, No. 4 (2009): pp. 607-626.
Funes, et al., "Gaze estimation from multimodal Kinect data". In Proc. of CVPR Workshop on Gesture Recognition, Rhode Island, US, Jun. 2012.
Cao, et al., "Face alignment by explicit shape regression." In Computer Vision and Pattern Recognition (CVPR), 2012 IEEE Conference on, pp. 2887-2894. IEEE, 2012.
Shaoqing, et al., "Face alignment at 3000 FPS via Regressing Local Binary Features." In Computer Vision and Pattern Recognition (CVPR), 2014 IEEE Conference on. IEEE, 2014.
Zhang, Zhengyou. "A flexible new technique for camera calibration." Pattern Analysis and Machine Intelligence, IEEE Transactions on 22, No. 11 (2000): 1330-1334.
Li, et al., "Starburst: A hybrid algorithm for video-based eye tracking combining feature-based and model-based approaches." In Computer Vision and Pattern Recognition-Workshops, 2005. CVPR Workshops. IEEE Computer Society Conference on, pp. 79-79. IEEE, 2005.
Ni, et al., "Fast radial symmetry detection under affine transformations." In Computer Vision and Pattern Recognition (CVPR), 2012 IEEE Conference on, pp. 932-939. IEEE, 2012.
Dementhon, et al., "Model-based object pose in 25 lines of code." International journal of computer vision 15, No. 1-2 (1995): 123-141.
Dedhia, et al., "Object Orientation Estimation", U.S. Appl. No. 14/288,287, filed May 27, 2014. 54 pages.
Xiong, et al., "Eye Gaze Tracking Using an RGBD Camera: A Comparison with an RGB Solution", 4th International Workshop on Pervasive Eye Tracking and Mobile Eye-Based Interaction (PETMEI). Sep. 13, 2014. 9 pages.
Bandera, C. et al., "Residual Q-Learning Applied to Visual Attention," Thirteenth International Conference on Machine Learning, Jul. 1996, 8 pages.
Sprague, N. et al., "Eye Movements for Reward Maximization," Advances in Neural Information Processing Systems, Dec. 2003, 8 pages.
Wang, Y. et al., "Iris Recognition Using Independent Component Analysis," Fourth International Conference on Machine Learning and Cybernetics, vol. 7, Aug. 2005, 6 pages.
Ziauddin, S. et al., "A Robust Hybrid Iris Localization Technique," ECTI-CON 2009—Sixth International Conference on Electrical Engineering/Electronics, Computer, Telecommunications and Information Technology, vol. 2, May 2009, 4 pages.
Valenti, R. et al., "Accurate Eye Center Location through Invariant Isocentric Patterns," IEEE Transactions on Pattern Analysis and Machine Intelligence, vol. 34, No. 9, Dec. 2011, 14 pages.
Sesma, L. et al., "Evaluation of Pupil Center-Eye Corner Vector for Gaze Estimation Using a Web Cam," ETRA 2012—Symposium on Eye Tracking Research and Applications, Mar. 2012, 4 pages.
Shen, Y. et al., "Evolutionary Adaptive Eye Tracking for Low-Cost Human Computer Interaction Applications," Journal of Electronic Imaging, vol. 22, No. 1, Mar. 2013, 24 pages.
Li, X. et al., "A Fast and Accurate Iris Localization Method Based on Gray Level Statistics and Region Properties," 2013 International Conference on Machine Learning and Cybernetics, Jul. 2013, 6 pages.
Rana, M. et al., "Eye Detection and Iris Center Tracking with Eyelashes Occlusion Correction," International Arab Conference on Information Technology, Dec. 2013, 5 pages.
Zhu, J. et al., "Subpixel Eye Gaze Tracking," Proceedings of the Fifth IEEE International Conference on Automatic Face and Gesture Recognition (FGR'02), May 20, 2002, Washington, D.C., 6 Pages.
ISA European Patent Office, International Search Report and Written Opinion Issued in Application No. PCT/US2015/067758, dated Apr. 19, 2016, WIPO, 10 Pages.
IPEA European Patent Office, Second Written Opinion Issued in Application No. PCT/US2015/067758, dated Oct. 11, 2016, WIPO, 6 Pages.
IPEA European Patent Office, International Preliminary Report on Patentability Issued in PCT Application No. PCT/US2015/067758, Feb. 6, 2017, WIPO, 7 Pages.

* cited by examiner

GAZE TRACKING VIA EYE GAZE MODEL

BACKGROUND

Tracking a person's gaze direction via a computing system may find use in many applications, including but not limited to human-computer interactions, visual attention analysis, and assistive technologies for people with disabilities. For example, a gaze direction of a person may be used to determine a location at which the person's gaze intersects a graphical user interface of a computing system. The determined location then may be used as an input signal for interacting with the graphical user interface.

SUMMARY

Examples are disclosed herein that are related to gaze tracking via image data. One example provides, on a gaze tracking system comprising an image sensor, a method comprising acquiring image data via the image sensor, detecting in the image data facial features of a human subject, determining an eye rotation center based upon the facial features using a calibrated face model, determining an estimated position of a center of a lens of an eye from the image data, determining an optical axis based upon the eye rotation center and the estimated position of the center of the lens, determining a visual axis by applying an adjustment to the optical axis, determining the gaze direction based upon the visual axis, and providing an output based upon the gaze direction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
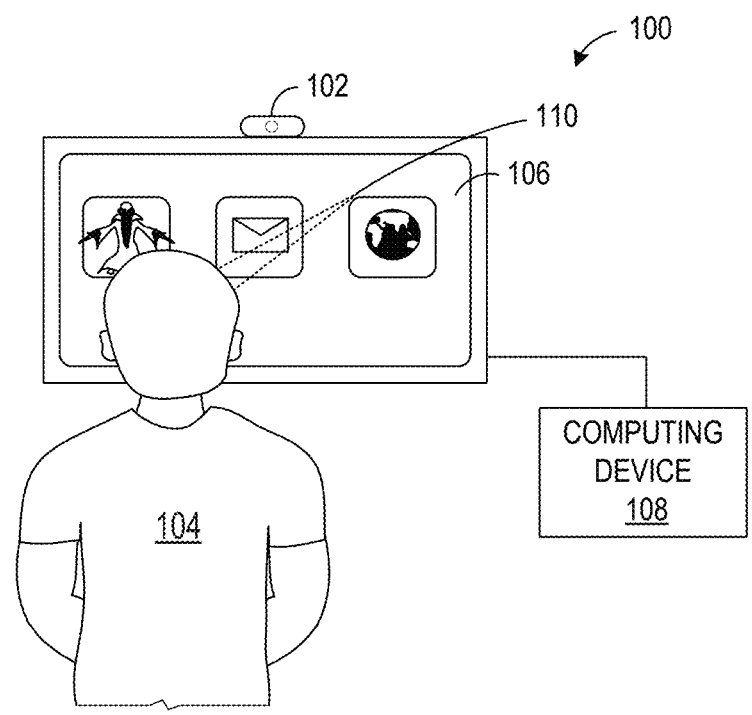
FIG. 1 shows an example gaze tracking system.

Gaze tracking systems may utilize image sensors to acquire image data of a person's eye. For example, some gaze tracking systems may utilize infrared images of a person's eye to locate corneal reflections of light ("glints") from glint light sources (e.g. infrared light sources directed toward the person's eye), to determine a person's gaze direction. However, ambient infrared illumination may interfere with infrared image sensors when used outdoors in the daytime. Further, high resolution infrared sensors with controlled infrared lighting sources may utilize more power than desired for portable battery-powered devices.

Accordingly, examples are disclosed herein that relate to gaze tracking without the use of glint light sources. The disclosed examples may allow gaze tracking to be implemented using two-dimensional (2D) image sensors, such as ordinary visible light cameras commonly found on computing devices. Such methods thus may allow gaze tracking to be implemented using image sensors widely available on current devices, and also may help to reduce power consumption and extend battery life. The disclosed methods also may optionally utilize depth images, for example, as acquired via one or more low-resolution depth sensors.

Various approaches have been used to perform gaze tracking without glint light sources, including but not limited to appearance-based, iris-based, and/or face-model-based approaches. Appearance-based approaches may utilize a regressor that maps an appearance of the eye to coordinates on a display interface (e.g. screen) being viewed. Changes in the appearance of the eye may be based on movements of the pupil. However, the appearance of the eye may also be influenced by other factors, such as illumination changes, head movements, etc. Thus, appearance-based approaches may require a significant amount of calibration data for training the regressor, which may impact a user experience.

Iris-based approaches may detect the iris using ellipse fitting methods. The shape of the ellipse, representing the iris shape, may then be used to determine the normal vector of the 3D iris. A gaze direction may then be approximated using the determined normal vector. However, occlusion by the eyelids, specular reflections of the iris, and/or noises in the image data may make extracting the shape of the iris difficult.

Face-model-based approaches may be more robust compared to appearance-based and iris-based approaches. Face-model-based approaches may determine three-dimensional (3D) locations of facial landmarks captured from image data. The 3D locations of the facial landmarks, such as that of the iris and/or the pupil, may be obtained via a stereo camera, and/or via 3D generic face models. Further, in face-model-based approaches, a center of the eyeball may be estimated based on the facial landmark locations. The estimation of the eyeball center may be further refined by a user calibration process. The optical axis of the eye (i.e. the axis extending through the centers of curvature of the front and back surfaces of the lens of the eye) then may be estimated based on the estimated eyeball center and the 3D iris and/or pupil center locations. The optical axis may then be used to determine a gaze direction in which a viewer is looking.

However, the use of 3D generic face models may provide inaccurate 3D locations of the facial landmarks on individuals, as the face models employed may not closely match various individuals. Further, the depth information from a stereo camera may not be sufficient for accurately estimating the gaze direction, as even small errors in the 3D landmark locations may result in large error in gaze estimation.

Accordingly, examples are disclosed herein that relate to gaze tracking utilizing a person-specific face model. The use of a face model calibrated to a specific person may facilitate accurate head pose estimates and facial landmark detection, and may allow for robust and accurate gaze determinations without the use of high resolution infrared cameras.

FIG. 1 shows an example gaze tracking system 100. Gaze tracking system 100 comprises an image sensor 102 that may be used to acquire images of a person 104 viewing a display 106 of a computing device 108, for example, to determine a location 110 at which a gaze of person 104 intersects display 106. Location 110 thus may be used as a position signal for interacting with a graphical user interface displayed on display 106. While depicted in the context of a larger format display (e.g. a monitor or television), it will be understood that the disclosed examples may be used with any suitable computing device, including but not limited to mobile devices, wearable devices, etc. Further, it will be understood that image sensor 102 may represent any suitable type of image sensor and/or combination of image sensors. For example, image sensor 102 may represent a visible light image sensor, an infrared image sensor, a depth image sensor, and/or two or more of such sensors whether enclosed in a common housing or separately housed. Such an image sensor may be incorporated into a computing device performing gaze tracking, or may be physically separate from the computing device.

Figure 2:
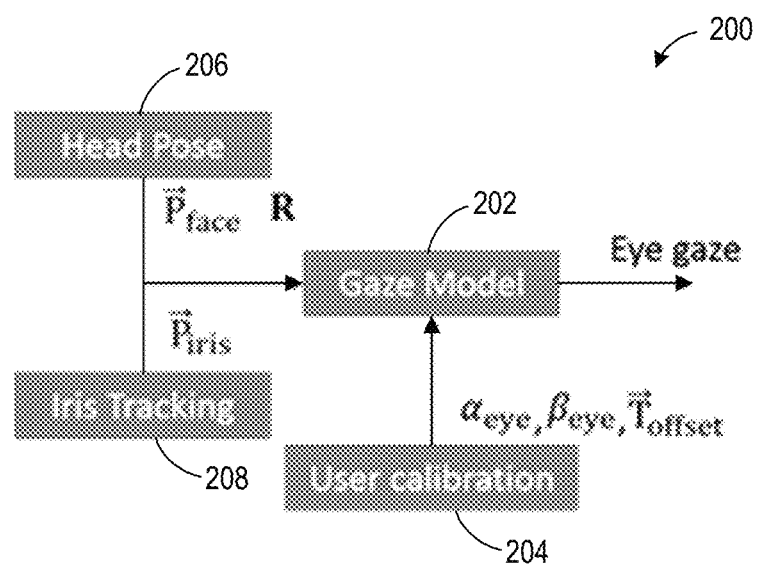
FIG. 2 shows a schematic representation of an example gaze tracking process pipeline.

FIG. 2 shows a schematic representation of a gaze tracking pipeline 200 that utilizes a gaze model 202 for gaze tracking. Gaze model 202 utilizes a face model and visual axis offset adapted to the anatomical features of individual users via user calibration 204. For example, user calibration may be performed to determine biometric parameters such as $\alpha_{eye}$ and $\beta_{eye}$, representing calibrated offsets between an optical axis and a visual axis, and also $\vec{T}_{offset}$, a calibrated offset vector between an eye rotation center and a face anchor point. Gaze model 202 further utilizes a head pose 206 and an iris location determined from iris tracking 208 as inputs. Head pose 206 may include information such as a head rotation matrix R and a face anchor point $\vec{P}_{face}$, whereas an iris location may be determined as an iris center $\vec{P}_{iris}$. As described below, these inputs may be determined from image data, such as two dimensional visible or infrared image data capturing a user's face. Using these inputs, gaze model 202 may be used to determine an eye gaze direction. The determination of a gaze direction is described in more detail below.

Figure 3:
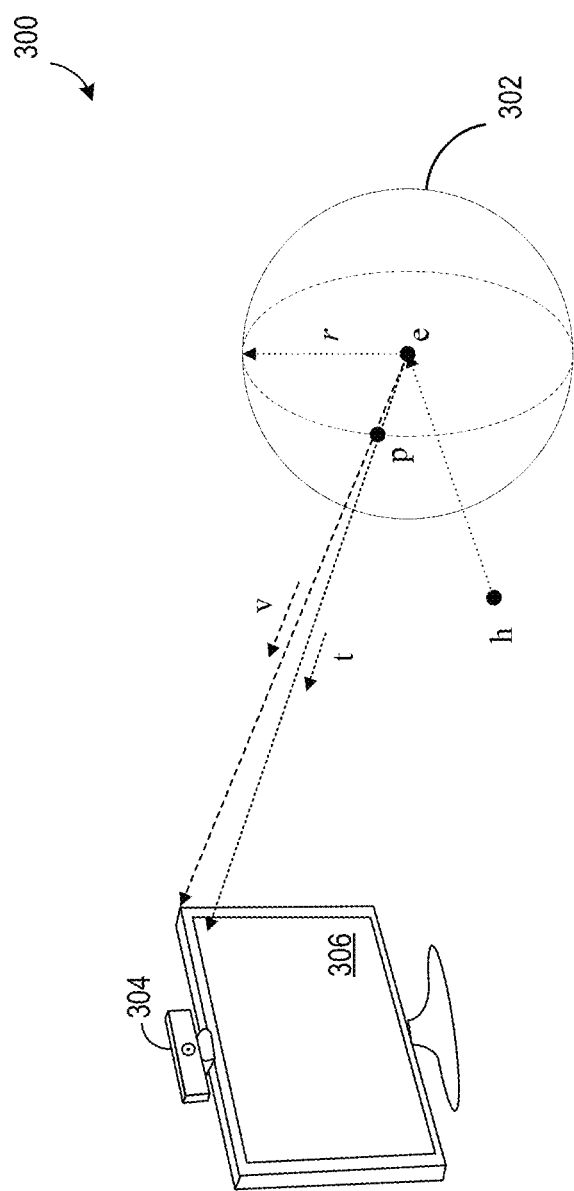
FIG. 3 shows a geometric representation of an example gaze model.

FIG. 3 shows a geometric representation of an example gaze model 300 that may be utilized in the gaze tracking pipeline of FIG. 2. A simplified representation of an eye is shown as an eyeball sphere 302. An image sensor 304 is configured to capture image data of the eye gazing at a screen 306 of a display interface. In FIG. 3, pupil center p lies on the eyeball sphere 302, and eyeball center e represents the center of eyeball sphere 302. An optical axis t may be defined by a straight line passing through eyeball center e and the pupil center p. A visual axis v, which corresponds to the gaze direction, may differ from t by an offset angle $\alpha_{eye}$ in the horizontal direction and/or an offset angle $\beta_{eye}$ in the vertical direction. The offset between the visual axis and the optical axis may arises due to the fovea of the human eye not being centered on the optical axis of the eye.

For each person, where the head coordinate system is centered at h, several biometric parameters may be initially unknown, including eyeball center e, eyeball radius r, $\alpha_{eye}$, and $\beta_{eye}$. These parameters may be inferred using a one-time calibration procedure, which will be described in further detail below.

Following calibration, a gaze direction may be estimated using the above mentioned parameters. First, the eyeball center at time t, $e^t$, may be translated from head coordinates to 3D world coordinates as follows:

$$e^t = h^t + R_h^t e,$$

where $h^t$ and $R_h^t$ denote the head center and head rotation matrix, respectively, at time t. As described in further detail below, the 3D head pose, used to determine $h^t$ and $R_h^t$, may be estimated from a 2D visible spectrum image. The optical axis direction $t^t$ may be represented as a normalized vector from $e^t$ to $p^t$, where $p^t$ denotes the pupil center at time t. Once the optical axis direction $t^t$ is determined, the visual axis direction $v^t$, i.e. the gaze direction, may be found by rotating the optical axis t horizontally by $\alpha_{eye}$ degrees and vertically by $\beta_{eye}$ degrees. Thus, visual axis direction $v^t$ may be computed as follows:

$$v^t = R_h^t R_{\alpha,\beta} (R_h^t)^{-1} t^t,$$

where $$R_{\alpha,\beta} = \begin{bmatrix} 1 & 0 & 0 \\ 0 & \cos\beta & \sin\beta \\ 0 & -\sin\beta & \cos\beta \end{bmatrix} \begin{bmatrix} \cos\alpha & 0 & -\sin\alpha \\ 0 & 1 & 0 \\ \sin\alpha & 0 & \cos\alpha \end{bmatrix}.$$

It will be noted that head rotation may be removed prior to applying the rotation offset between the optical and visual axes.

Figure 4:
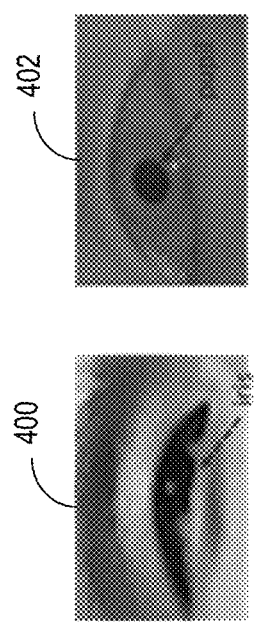
FIG. 4 shows examples images of an eye acquired with a visible light camera and with an infrared camera.

Any suitable type of image data may be used to determine the biometric parameters for gaze determination as disclosed herein. For example, in some examples, two dimensional (2D) visible color or grayscale image data may be used to detect an iris, as a boundary of the iris may show a strong feature contour in a visible light image. FIG. 4 shows an example visible light color RGB (red/green/glue) image 400 in which the iris is visible. In other examples, 2D infrared images may be used to detect a pupil. FIG. 4 also shows an infrared image 402 in which the pupil, rather than the iris, is sharply visible. Thus, it will be understood that, while the examples herein are described in terms of iris tracking using visible light image, pupil tracking may replace or supplement iris tracking when infrared image data of suitable resolution is available.

Continuing with FIG. 3, image sensor 304 may comprise any suitable type and number of image sensors, such as color (e.g. RGB) cameras, depth cameras, and/or infrared cameras. However, where more than one type of image sensor is utilized, one image sensor may have a different coordinate system than that of another image sensor. Further, the display interface screen 306 may have yet another coordinate system different than that of any of the image sensors. As such, a system calibration step may transform the coordinate systems of each of the image sensor(s) and the screen into a single, consistent coordinate system. For example, in a gaze tracking system utilizing both an RGB camera and a depth camera, the depth camera coordinate system and the screen coordinate system may both be calibrated to the RGB camera coordinate system. In some examples, the screen calibration may be performed by utilizing an auxiliary camera and a calibration pattern in front of the screen such that the auxiliary camera captures both the calibration pattern and the screen while the RGB camera also captures the calibration pattern. In other examples, any other suitable system calibration process may be used to match the different coordinate systems.

While the iris and/or the pupil of an eye may be detected in image data, and thus used to determine the iris and/or pupil center p, the eyeball center e, or eye rotation center, may not be directly visible in an image. Accordingly, the eye rotation center may be estimated by determining a head pose of the person. The eye rotation center may be represented as $\vec{P}_{eye} = \vec{P}_{face} + R\vec{T}_{offset}$, where $\vec{P}_{eye}$ is the position of the eye rotation center, $\vec{P}_{face}$ is the position of a face anchor point, R is a head rotation matrix, and $\vec{T}_{offset}$ is an offset vector between the eye rotation center and the face anchor point in a frontal pose of the head. The face anchor point $\vec{P}_{face}$ may comprise a facial landmark point, for example an eye inner corner, may comprise an average of a number of different facial landmark points, and/or may comprise a centroid of face mesh vertices. Such face landmark points are located on the surface of the person's face and may be estimated from 2D RGB and/or infrared images, for example using a face alignment method. Any suitable face alignment method may be used, including but not limited to explicit shape regression and local binary feature regression. The result of face alignment may provide 2D coordinates of face landmark points on a 2D RGB and/or infrared image, which may be further converted to 3D coordinates if depth image data is also available. It will be understood that when depth image data is unavailable, 3D coordinates may still be estimated from the 2D image data as described elsewhere herein. Further, the head rotation matrix R and the position of the face anchor point $\vec{P}_{face}$ may be determined by using any suitable head pose determination methods, including but not limited to the Procrustes analysis and active appearance model (AAM)-based high definition face tracking methods.

$\vec{P}_{offset}$ is person-specific and may be calibrated for each different person, as will be described in more detail below.

Figure 5C:
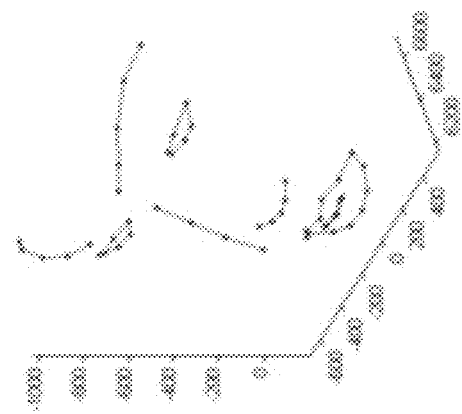
FIGS. 5A-C show example outputs of facial landmark detection and head pose estimation.
Figure 5B:
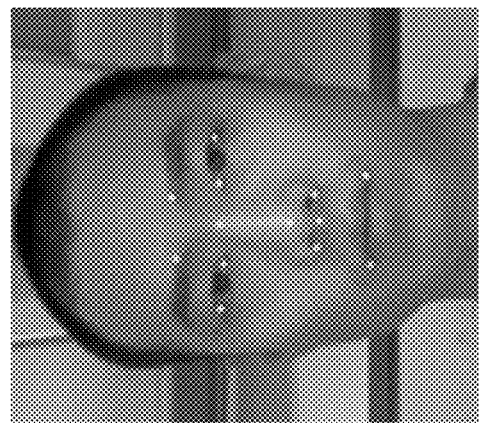
Figure 5A:
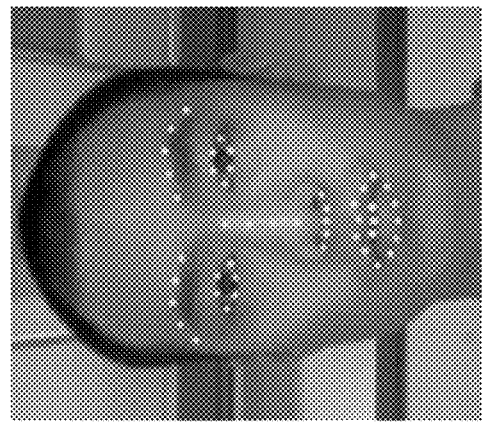

In one non-limiting example, where depth image data is available, facial landmarks on the RGB image may be tracked using a Supervised Descent Method (SDM). FIG. 5A shows an example output of SDM utilized to track facial landmarks. Based on 2D coordinates of the facial landmarks, corresponding 3D coordinates may be estimated from depth data. For tracking head pose, a person-specific 3D face model may be calibrated for each person. During calibration, the person may be instructed to keep a frontal pose to the infrared depth camera for a specified amount of time, e.g. one second. While the person holds the frontal pose, the infrared depth camera may capture image data and collect, for example, 10 sets of 49 different 3D facial landmarks, and average the sets of data to determine a reference 3D face model, $X_{ref}$. $X_{ref}$ may be defined, for example, as a matrix of size 3×n, where n is the number of landmarks and each column in the matrix represents the 3D position of one facial landmark. In an example experiment, to help increase the robustness of the head pose to facial expression changes, 13 rigid points on the face were used as facial landmarks, as shown in FIG. 5B. FIG. 5C shows an example 3D face model built based on experimental calibration data sets for a person. An example calibration process is also described below at FIG. 8.

A person's head pose may be measured relative to the reference model $X_{ref}$. The 3D head pose at frame t, (head rotation matrix $R_h^t$, translation vector $t^t$) may be obtained in any suitable manner. As one example, the 3D head pose at frame t may be obtained by minimizing the following equation:

$$\arg\min_{R_t, t_t} \|R_h^t X_{ref} + 1_{1 \times n} \otimes t^t - X^t\|,$$

where $\otimes$ denotes the Kronecker product and $1_{1 \times n}$ is a row vector of ones of size n. The above formulation is also known as the orthogonal Procrustes problem, which may be solved by finding a closest orthogonal matrix that maps $R_h^t$ to $X_{ref}$ using Singular Value Decomposition. However, least squares fitting may be sensitive to outliers. Infrared depth image data occasionally may produce zero depth values due to sensor noise. Thus, a local neighborhood search may be performed for any missing depth values. However, deriving the depth value for a missing point from a neighbor's depth value may result in a deviation from the true depth value. As such, points with fitting errors more than two standard deviations away from the mean may be removed, and a further minimization step may be repeated using the Procrustes equation on using the remaining points.

It will be noted that while depth imaging may be utilized in the disclosed gaze tracking methods, the methods also may be performed without depth data. For example, head pose may also be estimated from calibrated 2D image data and a person-specific face mode, such that 2D face landmark points on 2D RGB or infrared images may be used to estimate the corresponding 3D positions. As a non-limiting example, the 3D positions may be iteratively estimated using Pose from Orthography and Scaling with ITerations (POSIT). After locating facial landmarks on 2D image data, for each frame, POSIT may be used to estimate the person's head pose, for example, by iteratively minimizing the error between the predicted projection of a known 3D model and 2D landmarks tracked.

As mentioned above, the gaze tracking methods as disclosed may permit gaze tracking to be performed by using visible light (e.g. ambient light within the environment) to locate an iris of a user, as a boundary of the iris may be sharply defined in 2D RGB images. To perform gaze tracking in this manner, the boundary of the iris may be represented as an ellipse fitted to the boundary. This may allow an iris center $\vec{P}_{iris}$ to be determined from the ellipse, and a pupil center to be inferred based upon the iris center.

Any suitable ellipse fitting methods may be used, including but not limited to Starburst, a hybrid eye-tracking algorithm that integrates feature-based and model-based approaches. Starburst iteratively locates ellipse edge points and performs fast radial symmetry detection, which is similar to a Hough transform. Machine learning-based methods may also be utilized to detect the iris center by extracting image features and training classifiers with manually labeled ground truth. It will again be understood that the pupil center may also be detected via suitable infrared sensors when available.

Figure 6:
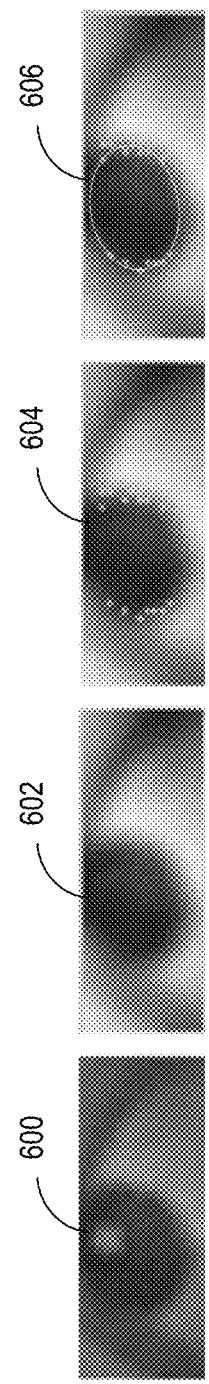
FIG. 6 shows images representing example data sets at various steps during an iris detection process.

FIG. 6 shows example data steps at various points in an iris detection process that using the Starburst ellipse fitting method. First, 600 shows an eye image cropped from a larger image using facial feature detection. Histogram equalization may then be applied to increase a contrast of the eye image. A binary image is shown at 602 that may be created by thresholding each pixel with a mean pixel value in the eye image. Connected-component analysis may be performed to fill holes, such as those caused by specular reflections, in the iris region followed by a Gaussian blur. In one non-limiting example, thirty rays may be emitted from a seed point terminated on the boundary of a polygon that defines the eye region. The direction of the rays may be uniformly distributed between −45° to 45° and 135° to 225°. Such a range may be acceptable to account for the possibility that portions of the iris may be occluded by the eyelids. The point yielding a greatest gradient value along each ray is considered as a candidate point of the iris boundary. The candidate points with gradient values lower than a predefined threshold may be removed, and the remaining points may be used to fit the ellipse. Further, candidate points with fitting residuals greater than two standard deviations away from the mean may be considered as outliers, and may thus be removed. An ellipse may then be refit on the remaining candidate points. The pupil center then may be estimated as the center of the fitted ellipse. It will be understood that the above-described ellipse-fitting method is described for the purpose of example, and that any other suitable ellipse fitting method may be used.

Figure 7:
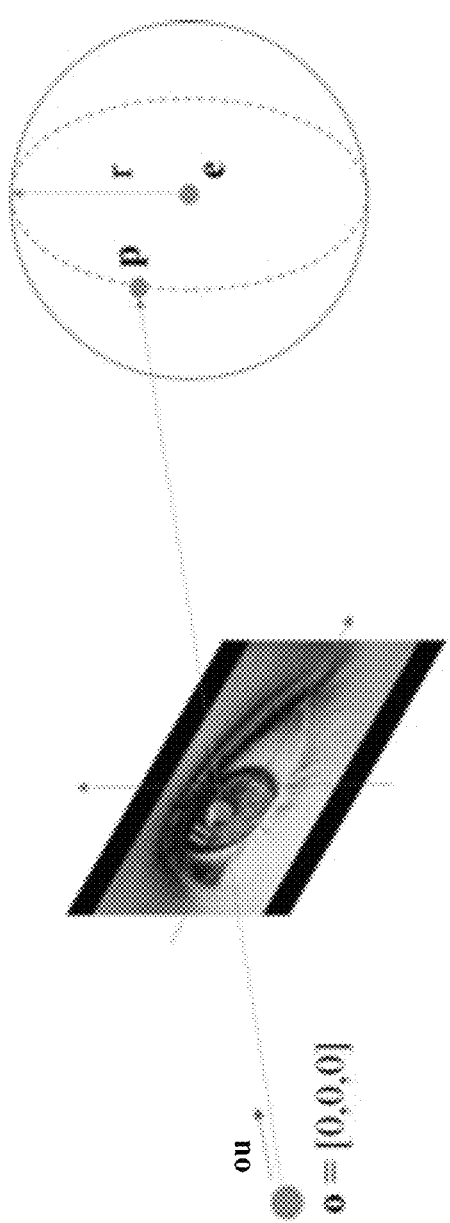
FIG. 7 shows an example mapping of 2D to 3D geometries of a pupil center.

FIG. 7 illustrates an example mapping of 2D and 3D geometries of a pupil center. Given the pupil center with 2D coordinates [u, v] in an ellipse-fitted image, the 3D position of the pupil center p in the 3D world may be determined. The 3D pupil center p is the intersection point between the eyeball sphere 700 and line $\vec{ou}$, where the camera center o is at the origin. The 3D coordinate corresponding to the 2D coordinate of the pupil center may be denoted as u=[u−$u_0$, v−$v_0$, f], where [$u_0$, $v_0$] is the image center from camera intrinsic parameters, and f is the camera focal length in pixels.

As described above, some biometric parameters, including the horizontal angle $\alpha_{eye}$ and the vertical angle $\beta_{eye}$ between the visual and optical axes, as well as the offset vector $\vec{T}_{offset}$, may be person-specific and thus initially unknown. Therefore, these quantities may be calibrated for each different person. A calibration process also may be configured to determine an eyeball center and eyeball radius.

Figure 8:
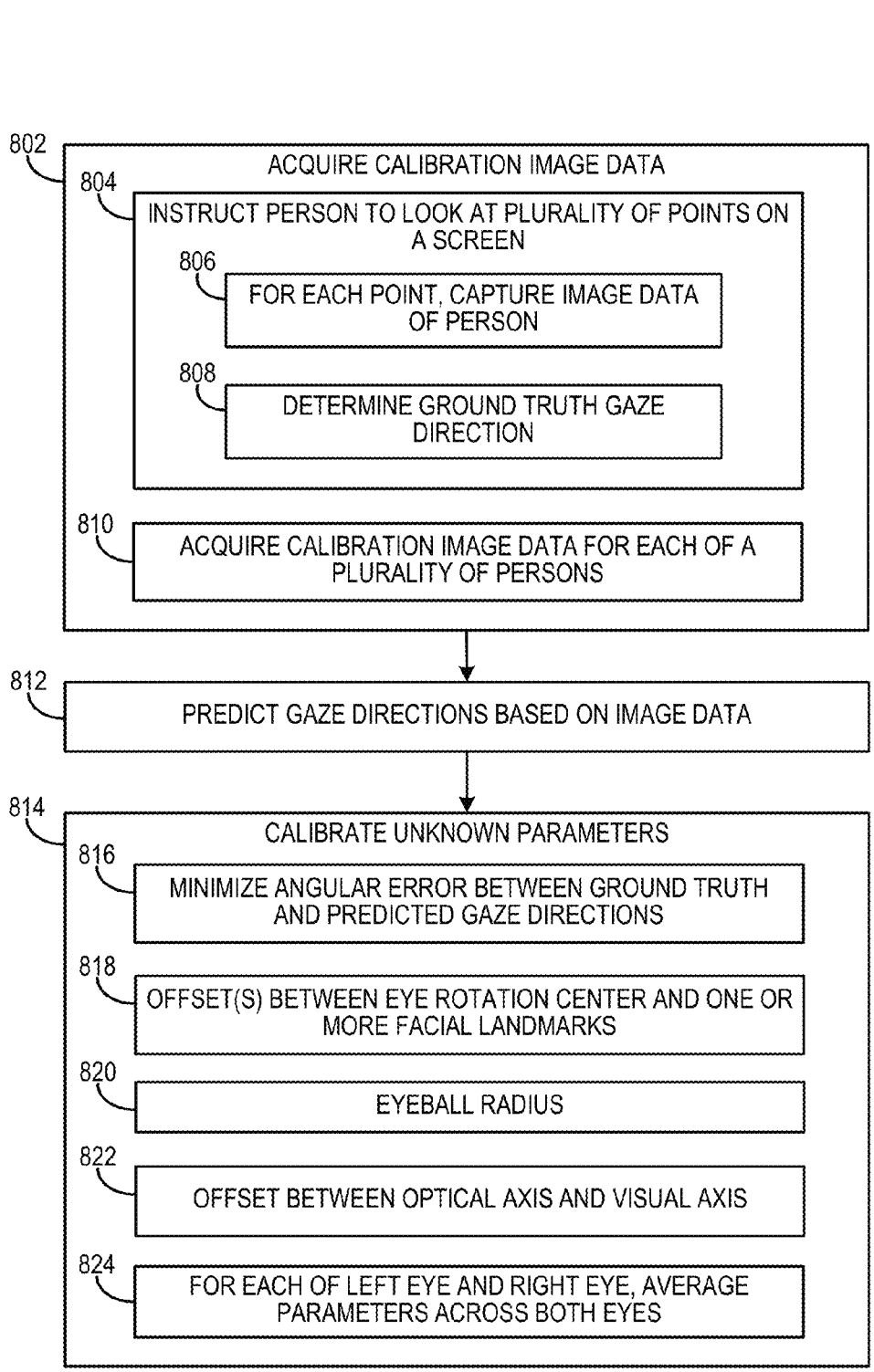
FIG. 8 shows an example method of calibrating unknown parameters for gaze tracking.

FIG. 8 shows a flow diagram depicting an example method 800 of calibrating biometric parameters for gaze tracking. At 802, method 800 comprises acquiring calibration image data. Image data may be acquired in any suitable manner, and may contain any suitable information. For example, as indicated at 804, acquiring the calibration image data may comprise instructing a person to look at a plurality of predefined points on a display screen, and at 806, capturing image data of the person gazing at each point. Ground truth gaze direction information may be determined from this image data, as indicated at 808. In some implementations, as indicated at 810, method 800 may comprise acquiring such calibration image data for each of a plurality of persons.

For the set of calibration image data acquired for each person, method 800 further comprises, at 812, predicting gaze directions using the image data, and at 814, calibrating the unknown parameters. With knowledge of a position, orientation and size of the display screen, an objective function may be built measuring the angular error between the ground truth gaze direction and the measured gaze direction. Values for the biometric parameters then may be determined, for example, by minimizing the mean angular error across all calibration data, as indicated at 816. As a non-limiting example, the constrained optimization by linear approximation (COBYLA) method may be used for optimization, and initial biometric parameters may be calibrated to be the human average. Any suitable parameters may be calibrated. Examples include, but are not limited to the offset(s) between the eye rotation center and one or more facial landmarks at 818, the eyeball radius at 820, and the offset between the optical axis and the visual axis at 822. Further, for each person, the biometric parameters of the left eye and the right eye of each person may be calibrated separately. A gaze direction may thus be estimated for each eye, and the results may be averaged across both eyes, as indicated at 824. This may help with the robustness of gaze estimation compared to methods in which the results are not averaged across both eyes.

Figure 9:
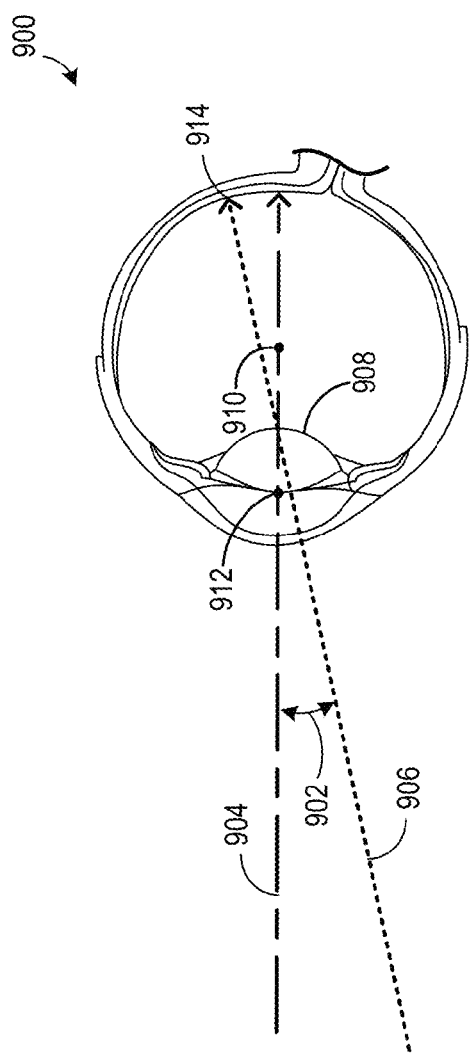
FIG. 9 shows a schematic diagram illustrating an example offset between an optical axis and a visual axis of a human eye.

As mentioned above, a visual axis of the human eye may be offset from an optical axis of the eye, and this offset may differ from person to person. FIG. 9 shows a schematic diagram of a human eye 900 illustrating an offset 902 between optical axis 904 and visual axis 906. Optical axis 904 may be defined as a hypothetical straight line passing through the centers of curvature of the front and back surfaces of the crystalline lens 908, and may be approximated by a line connecting the eye rotation center 910 and pupil center 912. Visual axis 906 extends from the midpoint of the visual field to the fovea centralis 914 of eye 900.

While the direction of the visual axis may not be directly measurable from the positions of the visual field midpoint and the fovea centralis, the visual axis may be estimated by calibrating the offset 902. For example, in the gaze model described above, the horizontal (pan) angle and the vertical (tilt) angle between the visual and optical axis may be denoted as $\alpha_{eye}$ and $\beta_{eye}$, respectively. As these two angles are person-specific, they may be calibrated for each person, for example, using the method of FIG. 8. The optical axis may be denoted as $$\frac{\vec{P}_{eye} - \vec{P}_{iris}}{\|\vec{P}_{eye} - \vec{P}_{iris}\|} = \begin{bmatrix} \cos\varphi_{eye}\sin\theta_{eye} \\ \sin\varphi_{eye} \\ -\cos\varphi_{eye}\cos\theta_{eye} \end{bmatrix}$$

where $\theta_{eye}$ and $\varphi_{eye}$ represent the horizontal and vertical angle of the optical axis orientation, respectively. As such, the visual axis may be defined as $$\begin{bmatrix} \cos(\varphi_{eye} + \beta_{eye})\sin(\theta_{eye} + \alpha_{eye}) \\ \sin(\varphi_{eye} + \beta_{eye}) \\ -\cos(\varphi_{eye} + \beta_{eye})\cos(\theta_{eye} + \alpha_{eye}) \end{bmatrix}.$$

Figure 10:
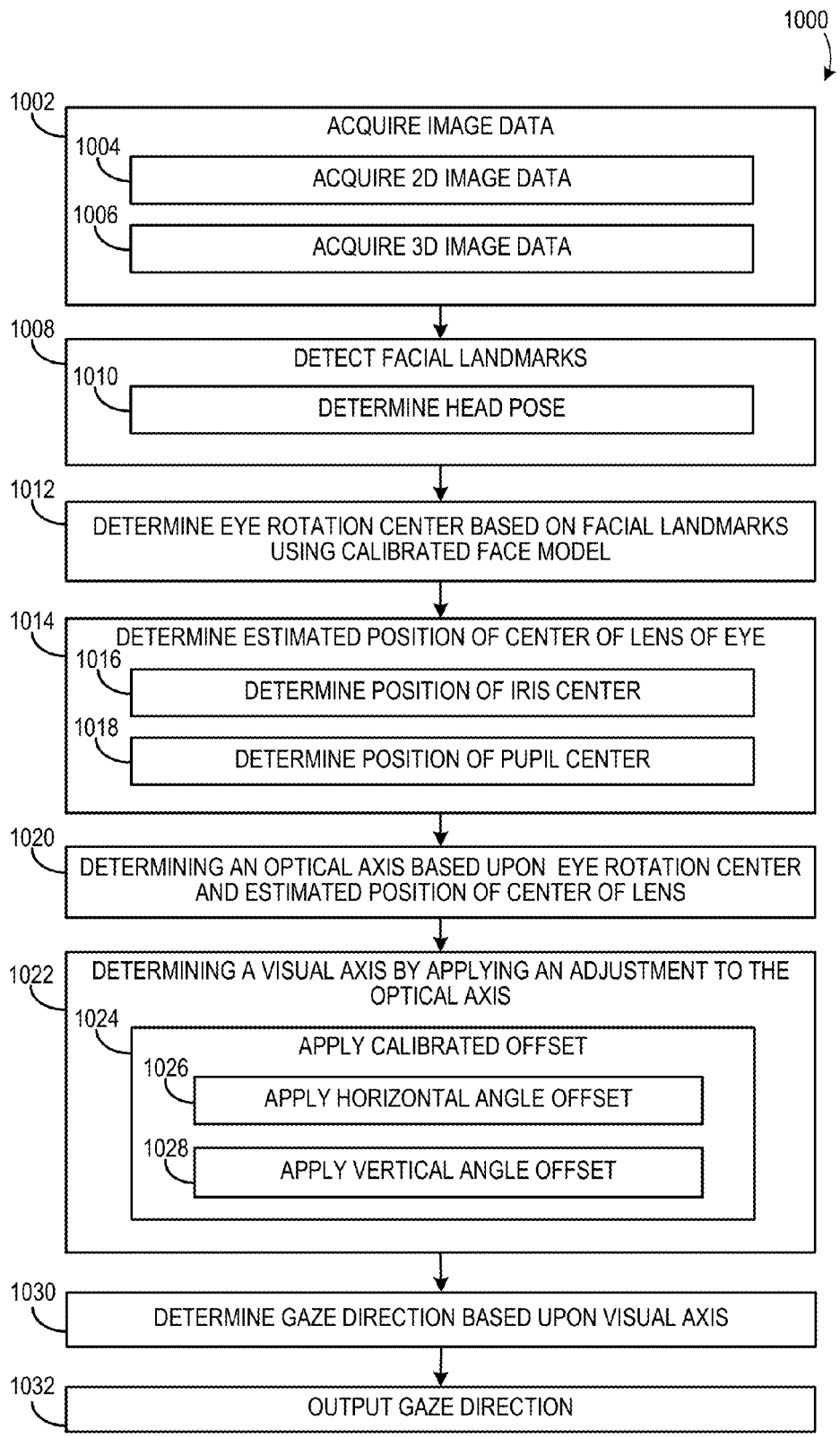
FIG. 10 shows a flow diagram illustrating an example method for gaze tracking.

FIG. 10 shows an example method 1000 of gaze tracking. Method 1000 comprises, at 1002, acquiring image data, which includes acquiring 2D image data at 1004 and acquiring 3D image data at 1006. As described above, any suitable image data may be acquired, including but not limited to visible light images (e.g. RGB images), infrared images, and depth images. Method 1000 further comprises, at 1008, detecting facial landmarks of a person based on the image data. This may include, at 1010, determining a head pose of the person. A head pose may be determined in any suitable manner, including but not limited to the Procrustes analysis, as described above. Method 1000 further comprises, at 1012, determining an eye rotation center based on the facial landmarks using a calibrated face model. As discussed herein, the use of a calibrated face model allows a gaze model to be personalized to each individual, which may result in more accurate gaze determinations compared to the use of models that are not personalized.

Method 1000 further comprises, at 1014, determining an estimated position of a center of a lens of the eye. This may include, for example, determining a position of an iris center at 1016, and/or determining a position of a pupil center at 1018. Accordingly, the eye rotation center and the estimated position of the center of the lens may be used to determine an optical axis, as shown at 1020. At 1022, method 1000 comprises determining a visual axis by applying an adjustment to the optical axis. As mentioned above, the adjustment may be calibrated for each person, and may include one or more of a horizontal angle offset 1026 and a vertical angle offset 1028, and/or any other suitable offset. Method 1000 further comprises, at 1030, determining the gaze direction based upon the determined visual axis, and at 1032, outputting the gaze direction. It will be understood that gaze tracking method 1000 may be used to determine a gaze direction for a person or for each of a plurality of persons.

Figure 11:
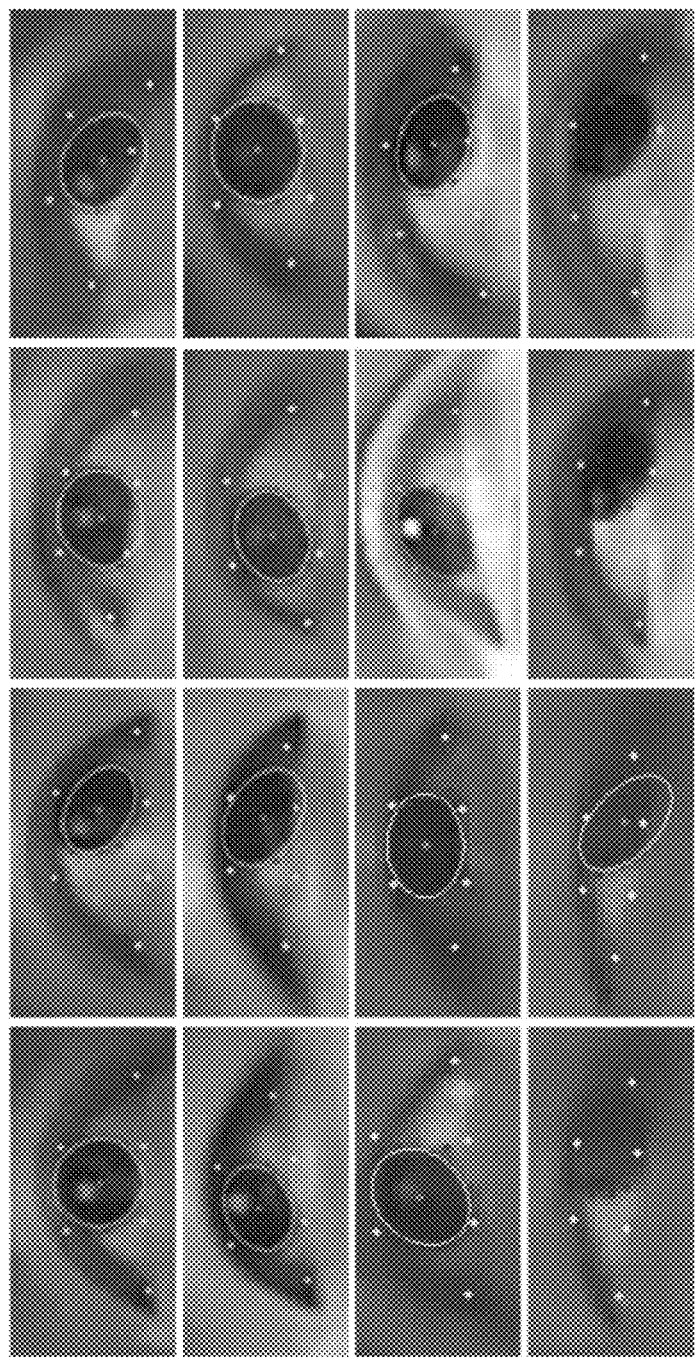
FIG. 11 shows examples of ellipses fit to irises in a sample set of images.
Figure 12:
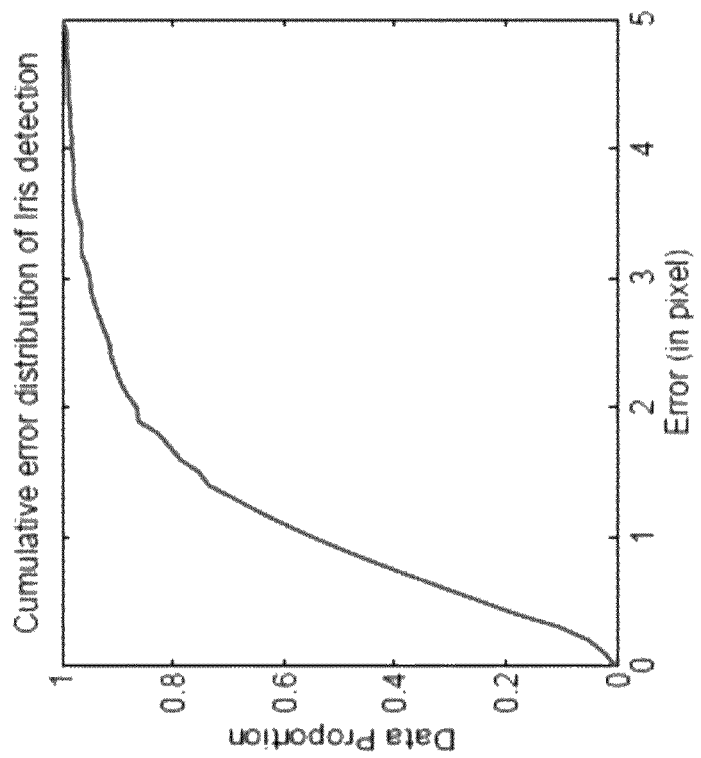
FIG. 12 shows a plot of cumulative error distribution in iris detection on an example experimental sample data set.

FIG. 11 depicts some examples of ellipses fit to a plurality of eye images in iris detection for a sample data set. The sample data set was obtained by asking individual subjects to look at nine predefined points on a monitor screen, and one or more images were taken for each point. A total of 157 images was collected from 13 different individuals. Because eye appearance may vary across people of different ethnicities, the subjects were from three different ethnic groups: Asian, Indian, and Caucasian. Each image in the data set was also flipped to double the sample size. The ground truth iris center was found by manually selecting points along the iris boundary, and fitting an ellipse to the selected points. The error in pixels was computed as the distance between the ground truth iris center and the predicted iris center. Out of 628 eyes, 555 were detected in the sample images. FIG. 12 is a graph of the cumulative error distribution for the sample data set, showing that 55% of the sample data has an error of less than 1 pixel, 75% less than 1.5 pixels, and 86% less than 2 pixels.

In another example experiment, the gaze tracking method as disclosed was performed on simulated data provided by a simulation program. The simulation program allowed control of the noise level of each parameter used in the gaze model. In the simulation, a perfect system calibration was assumed, and user calibration parameters were known in advance. Thus, the sources of error were largely from facial feature detection and iris/pupil detection. The simulation utilized a virtual camera, a virtual screen, and a 3D face model. The ground truth of facial landmarks was obtained by projecting the 3D face model onto an image plane using the virtual camera. Likewise, the same strategy was applied to obtain ground truth location of the pupil center.

Figure 13:
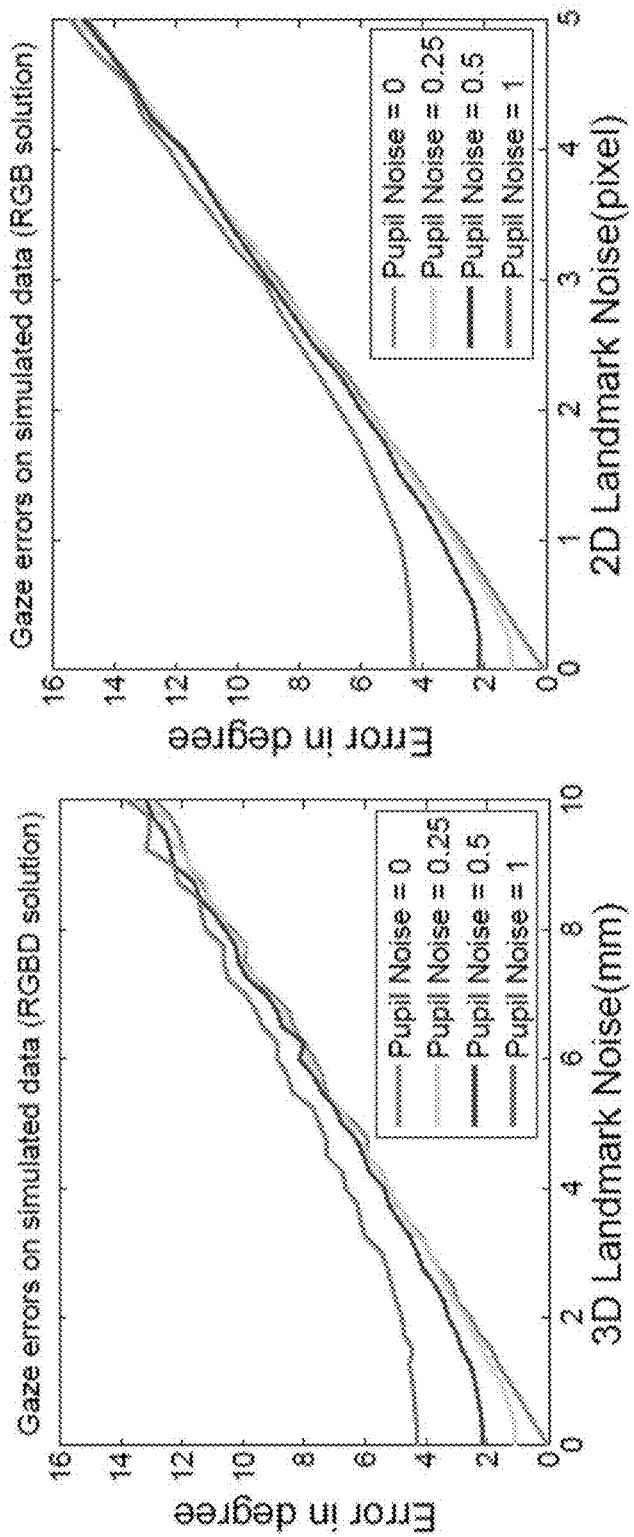
FIG. 13 shows plots of gaze errors against landmark noise of an example simulated sample data set for different camera configurations.

FIG. 13 shows a plot of the gaze errors against landmark noise for both RGBD (RGB and depth) and RGB solutions of an experimental simulation. In the RGBD solution (shown on the left), noise was directly added to the 3D landmarks, while in the RGB solution (shown on the right), noise was added to the 2D landmarks. The interocular distance of the project face was 100 pixels in the simulation. For both solutions, gaze error increases linearly with the noise added in landmark localization when no pupil noise was added The simulation also shows that accuracy of gaze estimation may improve with increase in quality of image and depth sensors. For example, in the RGBD solution, to achieve a 2° gaze accuracy, the errors in 3D landmark localization and pupil detection would need to be kept within 2 mm and 0.5 pixel, respectively. Achieving the same accuracy using the RGB solution would require both 2D landmark and pupil localization error to be less than 0.5 pixel.

Figure 14:
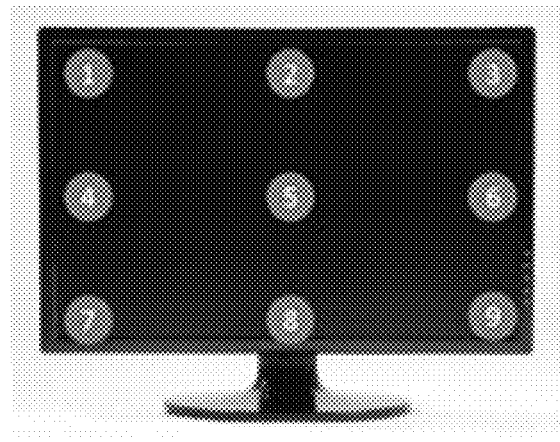
FIG. 14 shows example points on a screen that may be used to calibrate a gaze tracking system according to the present disclosure.

In yet another example experiment, gaze tracking was performed on real-world, non-simulated data collected using an infrared depth image sensor. In this experiment, the monitor used had a dimension of 520 mm by 320 mm. The distance between each test subject and the infrared sensor was between 600 mm and 800 mm. For a total of nine subjects, three training sessions and two testing sessions were conducted for each subject. During each training session, nine dots were displayed on the screen, as shown in FIG. 14. The subject was instructed to click on each dot via an input device controlling a cursor on the screen while avoiding head movement so that the subject looks at the dot via eye movement, and five images were taken upon each clicking action. After finishing each session, the subject was instructed to change seating position before starting the next session. Each testing session was also recorded in a similar manner, except with 15 images per point on the screen. Data collected in the training sessions was used for user calibration, while gaze errors were computed on the data from the testing sessions.

Figure 15:
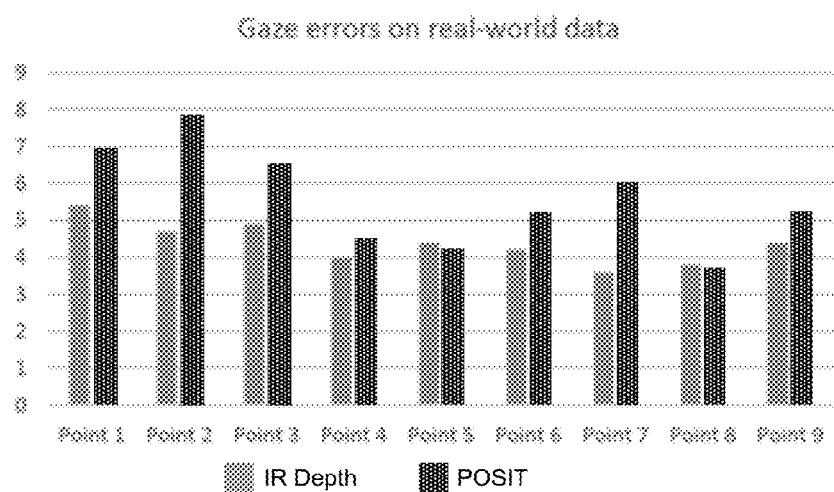
FIG. 15 shows a plot of gaze errors arising from different camera configurations.

FIG. 15 shows a plot of the gaze errors from both the RGB and RGBD solutions. The depth information in the RGBD solution comes from the infrared depth image sensor, while POSIT was used in the RGB solution to obtain depth information. The results were generated by averaging over 18 testing sessions. The RGBD solution gave a mean error of 4.4°, while the RGB solution gave a mean error of 5.6°. It will be noted that the RGBD solution outperforms the RGB solution, i.e. gives a smaller gaze error, except at Point 5 and Point 8 in FIG. 15.

Figure 16:
FIG. 16 shows example facial landmarks represented by colored stickers worn on a person's face.
Figure 17:
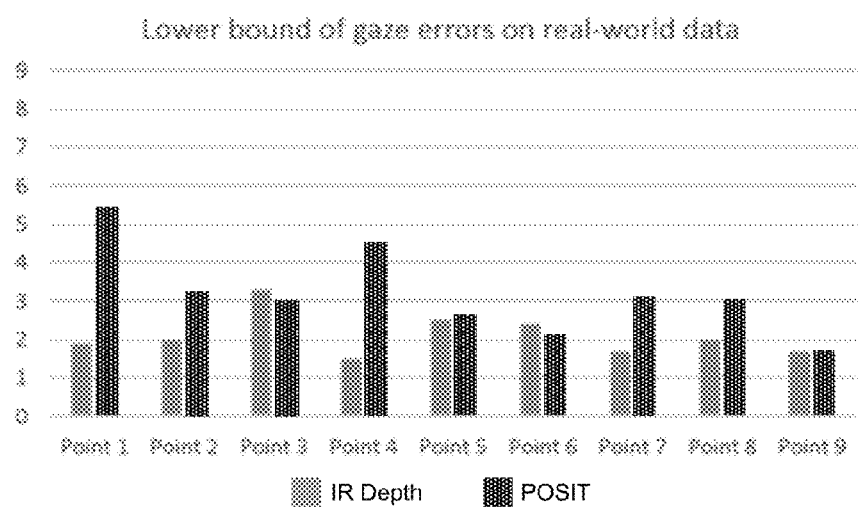
FIG. 17 shows a plot of the lower bound of gaze errors from RGB and RGBD solutions of an example real-world sample data set.

To estimate a lower bound of gaze error using these approaches, a subject in the experiment was asked to wear colored stickers on the face during data collection, such that the stickers could be treated as facial landmarks and be easily tracked. FIG. 16 shows an image of a subject wearing stickers as example facial landmarks. For iris detection, points along the boundary of the iris were manually selected, and an ellipse was fit onto the points. FIG. 17 shows a plot of the gaze errors computed with the use of the colored stickers. Here, the RGBD solution again outperformed the RGB solution, with mean errors of 2.1° and 3.2°, respectively. The lower bound of gaze error, with the infrared depth sensor used in the experiment, was estimated to be less than 2.1°.

In some embodiments, the methods and processes described herein may be tied to a computing system of one or more computing devices. In particular, such methods and processes may be implemented as a computer-application program or service, an application-programming interface (API), a library, and/or other computer-program product.

Figure 18:
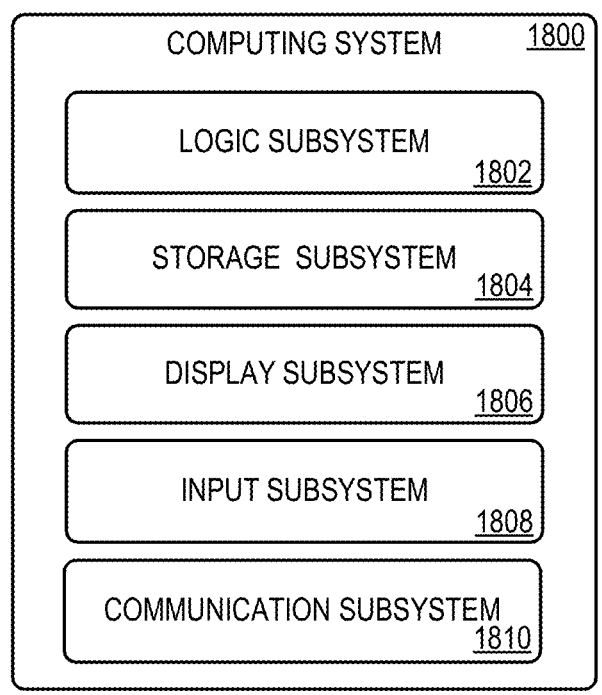
FIG. 18 shows a block diagram of an example computing system.

FIG. 18 schematically shows a non-limiting embodiment of a computing system 1800 that can enact one or more of the methods and processes described above. Computing system 1800 is shown in simplified form. Computing system 1800 may take the form of one or more personal computers, server computers, tablet computers, home-entertainment computers, network computing devices, gaming devices, mobile computing devices, mobile communication devices (e.g., smart phone), and/or other computing devices. Gaze tracking system 100 is a non-limiting example implementation of computing system 1800.

Computing system 1800 includes a logic subsystem 1802 and a storage subsystem 1804. Computing system 1800 may optionally include a display subsystem 1806, input subsystem 1808, communication subsystem 1810, and/or other components not shown in FIG. 18.

Logic subsystem 1802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 1802 may include one or more processors configured to execute software instructions. Additionally or alternatively, logic subsystem 1802 may include one or more hardware or firmware logic machines configured to execute hardware or firmware instructions. Processors of logic subsystem 1802 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of logic subsystem 1802 may be virtualized and executed by remotely accessible, networked computing devices configured in a cloud-computing configuration.

Storage subsystem 1804 includes one or more physical devices configured to hold instructions executable by logic subsystem 1802 to implement the methods and processes described herein. When such methods and processes are implemented, the state of storage subsystem 1804 may be transformed—e.g., to hold different data.

Storage subsystem 1804 may include removable and/or built-in devices. Storage subsystem 1804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1804 may include volatile, nonvolatile, dynamic, static, read/write, read-only, random-access, sequential-access, location-addressable, file-addressable, and/or content-addressable devices.

It will be appreciated that storage subsystem 1804 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1802 and storage subsystem 1804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, display subsystem 1806 may be used to present a visual representation of data held by storage subsystem 1804. This visual representation may take the form of a graphical user interface (GUI). As the herein described methods and processes change the data held by the storage machine, and thus transform the state of the storage machine, the state of display subsystem 1806 may likewise be transformed to visually represent changes in the underlying data. Display subsystem 1806 may include one or more display devices utilizing virtually any type of technology. Such display devices may be combined with logic subsystem 1802 and/or storage subsystem 1804 in a shared enclosure, or such display devices may be peripheral display devices.

When included, input subsystem 1808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1810 may be configured to communicatively couple computing system 1800 with one or more other computing devices. Communication subsystem 1810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

Another example provides, on a gaze tracking system comprising an image sensor, a method of determining a gaze direction, the method comprising acquiring image data via the image sensor, detecting in the image data facial features of a human subject, determining an eye rotation center based upon the facial features using a calibrated face model, determining an estimated position of a center of a lens of an eye from the image data, determining an optical axis based upon the eye rotation center and the estimated position of the center of the lens, determining a visual axis by applying an adjustment to the optical axis, determining the gaze direction based upon the visual axis, and providing an output based upon the gaze direction. In this example, method may additionally or alternatively include wherein the image sensor includes a 2D visible light image sensor, and wherein the image data includes visible image data. The method may additionally or alternatively include detecting the facial features by locating 2D positions of the facial features in the visible image data, and determining 3D positions of the facial features from the 2D positions. The method may additionally or alternatively include wherein the estimated position of the center of the lens includes a position of an iris center. The method may additionally or alternatively include wherein the image sensor includes an infrared camera, and wherein the image data includes infrared image data, and wherein the estimated position of the center of the lens includes a position of a pupil center. The method may additionally or alternatively include wherein the image data comprises two-dimensional image data and depth image data. The method may additionally or alternatively include detecting in the image data facial features of a plurality of human subjects, and obtaining a calibrated face model for each of the plurality of human subjects. The method may additionally or alternatively include estimating a head pose of the human subject based on the facial features. The method may additionally or alternatively include determining the eye rotation center based upon the facial features by determining a calibrated offset between the eye rotation center and one or more of the facial features. The method may additionally or alternatively include applying the adjustment to the optical axis by applying a calibrated offset to the optical axis. Any or all of the above-described examples may be combined in any suitable manner in various implementations.

Another example provides a gaze tracking system comprising an image sensor, a logic subsystem, and a storage subsystem comprising instructions executable by the logic subsystem to acquire image data, detect in the image data facial features of a human subject, determine an eye rotation center based upon the facial features using a calibrated face model, determine an estimated position of a center of a lens of an eye from the image data, determine an optical axis based upon the eye rotation center and the estimated position of the center of the lens, determine a visual axis by applying an adjustment to the optical axis, determine the gaze direction based upon the visual axis, and provide an output based upon the gaze direction. The gaze tracking system may additionally or alternatively include instructions executable by the logic subsystem to determine the eye rotation center based upon 2D positions of the facial features using the calibrated face model. The gaze tracking system may additionally or alternatively include an infrared image sensor and a visible light image sensor. The gaze tracking system may additionally or alternatively include instructions executable by the logic subsystem to detect in the image data facial features of a plurality of human subjects, and to obtain a calibrated face model for each of the plurality of human subjects. The gaze tracking system may additionally or alternatively include instructions executable by the logic subsystem to estimate a head pose of the user based on the facial features, to determine a calibrated offset between the eye rotation center and one or more of the facial features, and to determine the estimated position of the center of the lens by locating a center of an ellipse fitted to an iris of the eye in the image data. Any or all of the above-described examples may be combined in any suitable manner in various implementations.

Another example provides a gaze tracking system comprising a visible light image sensor and a depth image sensor configured to acquire image data, a logic subsystem, and a storage subsystem comprising instructions executable by the logic subsystem to detect in the image data facial features of a human subject, determine an eye rotation center based upon the facial features using a calibrated face model, determine an estimated position of a center of a lens of an eye from the image data, determine an optical axis based upon the eye rotation center and the estimated position of the center of the lens, determine a visual axis by applying an adjustment to the optical axis, determine the gaze direction based upon the visual axis, and provide an output based upon the gaze direction. The gaze tracking system may additionally or alternatively include an infrared image sensor configured to acquire infrared image data. Any or all of the above-described examples may be combined in any suitable manner in various implementations.

The invention claimed is:

1. On a gaze tracking system comprising an image sensor, a method of determining a gaze direction, the method comprising:
acquiring image data via the image sensor;
detecting in the image data facial features of a human subject;
determining an eye rotation center based upon the facial features using a calibrated face model previously calibrated to a face of the human subject, the calibrated face model relating an offset of the eye rotation center to the facial features;
determining an estimated position of a center of a lens of an eye from the image data;
determining an optical axis based upon the eye rotation center and the estimated position of the center of the lens, the optical axis extending through the eye rotation center and the estimated position of the center of the lens;
determining a visual axis by applying an adjustment to the optical axis;
determining the gaze direction based upon the visual axis; and
providing an output based upon the gaze direction determined from applying the calibrated face model.

2. The method of claim 1, wherein the image sensor comprises a 2D visible light image sensor, and wherein the image data comprises visible image data.

3. The method of claim 2, wherein detecting the facial features comprises locating 2D positions of the facial features in the visible image data, and further comprising determining 3D positions of the facial features from the 2D positions.

4. The method of claim 2, wherein the estimated position of the center of the lens comprises a position of an iris center.

5. The method of claim 1, wherein the image sensor comprises an infrared camera, and wherein the image data comprises infrared image data, and wherein the estimated position of the center of the lens comprises a position of a pupil center.

6. The method of claim 1, wherein the image data comprises two-dimensional image data and depth image data.

7. The method of claim 1, further comprising detecting in the image data facial features of a plurality of human subjects, and obtaining a calibrated face model for each of the plurality of human subjects.

8. The method of claim 1, further comprising estimating a head pose of the human subject based on the facial features.

9. The method of claim 1, wherein determining the eye rotation center based upon the facial features comprises determining a calibrated offset between the eye rotation center and one or more of the facial features.

10. The method of claim 1, wherein applying the adjustment to the optical axis comprises applying a calibrated offset to the optical axis.

11. A gaze tracking system comprising:
an image sensor;
a logic subsystem; and
a storage subsystem comprising instructions executable by the logic subsystem to:
acquire image data,
detect in the image data facial features of a human subject,
determine an eye rotation center based upon the facial features using a calibrated face model previously calibrated to a face of the human subject, the calibrated face model relating an offset of the eye rotation center to the facial features,
determine an estimated position of a center of a lens of an eye from the image data,
determine an optical axis based upon the eye rotation center and the estimated position of the center of the lens,
determine a visual axis by applying an adjustment to the optical axis,
determine a gaze direction based upon the visual axis, and
provide an output based upon the gaze direction determined from applying the calibrated face model.

12. The gaze tracking system of claim 11, further comprising instructions executable by the logic subsystem to determine the eye rotation center based upon 2D positions of the facial features using the calibrated face model.

13. The gaze tracking system of claim 11, further comprising an infrared image sensor.

14. The gaze tracking system of claim 11, further comprising a visible light image sensor.

15. The gaze tracking system of claim 11, further comprising instructions executable by the logic subsystem to detect in the image data facial features of a plurality of human subjects, and to obtain a calibrated face model for each of the plurality of human subjects.

16. The gaze tracking system of claim 11, further comprising instructions executable by the logic subsystem to estimate a head pose based on the facial features.

17. The gaze tracking system of claim 11, further comprising instructions executable by the logic subsystem to determine a calibrated offset between the eye rotation center and one or more of the facial features.

18. The gaze tracking system of claim 11, further comprising instructions executable by the logic subsystem to determine the estimated position of the center of the lens by locating a center of an ellipse fitted to an iris of the eye in the image data.

19. A gaze tracking system comprising:
a visible light image sensor and a depth image sensor configured to acquire image data;
a logic subsystem; and
a storage subsystem comprising instructions executable by the logic subsystem to:
detect in the image data facial features of a human subject,
determine an eye rotation center based upon the facial features using a calibrated face model previously calibrated to a face of the human subject, the calibrated face model relating an offset of the eye rotation center to the facial features,
determine an estimated position of a center of a lens of an eye from the image data,
determine an optical axis based upon the eye rotation center and the estimated position of the center of the lens,
determine a visual axis by applying an adjustment to the optical axis,
determine a gaze direction based upon the visual axis, and
provide an output based upon the gaze direction determined from applying the calibrated face model.

20. The gaze tracking system of claim 19, further comprising an infrared image sensor configured to acquire infrared image data.

* * * * *